United States Patent
Garsuch et al.

(10) Patent No.: US 8,679,436 B2
(45) Date of Patent: Mar. 25, 2014

(54) PROCESS FOR WORKING UP AN EXHAUST GAS FROM A SYSTEM FOR PRODUCING HYDROXYLAMINE OR HYDROXYLAMMONIUM SALTS

(75) Inventors: Arnd Garsuch, Ludwigshafen (DE); Alexander Panchenko, Ludwigshafen (DE); Sigmar Bräuninger, Hemsback (DE); Jens Scheidel, Hirschberg (DE); Alfred Thome, Speyer (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/876,496

(22) PCT Filed: Sep. 27, 2011

(86) PCT No.: PCT/EP2011/066781
§ 371 (c)(1),
(2), (4) Date: Mar. 28, 2013

(87) PCT Pub. No.: WO2012/041859
PCT Pub. Date: Apr. 5, 2012

(65) Prior Publication Data
US 2013/0183222 A1     Jul. 18, 2013

Related U.S. Application Data

(60) Provisional application No. 61/388,019, filed on Sep. 30, 2010.

(30) Foreign Application Priority Data

Sep. 30, 2010   (EP) ..................................... 10184335

(51) Int. Cl.
*B01D 53/34*     (2006.01)
*B01D 53/46*     (2006.01)
*C07C 215/00*    (2006.01)

(52) U.S. Cl.
USPC ........................... 423/248; 564/503; 564/292

(58) Field of Classification Search
USPC .................................. 423/248; 564/503, 292
See application file for complete search history.

(56) References Cited

U.S. PATENT DOCUMENTS 4,507,271 A    3/1985   Van Deyck et al.
6,303,089 B1 *   10/2001   Wallace et al. ............... 423/248

FOREIGN PATENT DOCUMENTS

| DE | 03244370 A1 | 6/1984 |
| EP | 1275616 A1 | 1/2003 |
| KR | 20070109477 A | 11/2007 |
| WO | WO-02/30549 A1 | 4/2002 |

OTHER PUBLICATIONS

International Search Report for PCT/EP2011/066781 mailed Mar. 28, 2012.
International Preliminary Report on Patentability for PCT/EP2011/066781, dated Apr. 2, 2013.
Lee, et al., "Hydrogen separation using electrochemical method", Journal of Power Sources, vol. 132, (2004), pp. 92-98.

* cited by examiner

*Primary Examiner* — Timothy Vanoy
(74) *Attorney, Agent, or Firm* — Novak Druce Connolly Bove + Quigg LLP

(57) ABSTRACT

Process for working up an exhaust gas from a system for producing hydroxylamine or hydroxylammonium salts by catalytic reduction of nitrogen monoxide with hydrogen, the exhaust gas containing nitrogen monoxide, hydrogen, dinitrogen monoxide, nitrogen and ammonia. At least some of the hydrogen present in the exhaust gas is separated off from the exhaust gas by means of a gas-tight membrane-electrode assembly which comprises at least one selectively proton-conducting membrane, a retentate side, a permeate side, and, on each side of the membrane, at least one electrode catalyst, wherein, on the retentate side of the membrane, at least some of the hydrogen is oxidized to protons at the anode catalyst and the protons, after crossing the membrane, are, on the permeate side, at the cathode catalyst according to (I) reduced to hydrogen and/or (II) reacted with oxygen to form water, the oxygen originating from an oxygen-containing stream which is contacted with the permeate side.

15 Claims, No Drawings

PROCESS FOR WORKING UP AN EXHAUST GAS FROM A SYSTEM FOR PRODUCING HYDROXYLAMINE OR HYDROXYLAMMONIUM SALTS

CROSS-REFERENCE TO RELATED APPLICATIONS

This application is a national stage application (under 35 U.S.C. §371) of PCT/EP2011/066781, filed Sep. 27, 2011, which claims benefit of U.S. Provisional Application No. 61/388,019, filed Sep. 30, 2010, and European Application No. 10184335.7, filed Sep. 30, 2010, both of which are incorporated herein by reference in their entirety.

The present invention relates to a process for working up an exhaust gas from a system for producing hydroxylamine or hydroxylammonium salts, wherein at least some of the hydrogen present in the exhaust gas A is separated off electrochemically by means of a gas-tight membrane-electrode assembly.

In the production of hydroxylamine or hydroxylammonium salts by catalytic hydrogenation of nitrogen monoxide with hydrogen, inter alia, dinitrogen monoxide, nitrogen and ammonia are formed as byproducts. In this case, hydrogen is used in great excess and the nitrogen monoxide is only partially reacted. Exhaust gases are obtained that comprise hydrogen, nitrogen monoxide, dinitrogen monoxide and possibly inert substances. These exhaust gas mixtures cannot be directly recycled into the synthesis, since otherwise the dinitrogen monoxide would build up and explosive mixtures of hydrogen, nitrogen monoxide and dinitrogen monoxide would occur. The dinitrogen monoxide is inert in the process of producing hydroxylamine or hydroxylammonium salts.

Nitrogen and dinitrogen monoxide are not converted to hydroxylamine under reaction conditions of hydrogenation.

Furthermore, the exhaust gas of the hydroxylammonium synthesis comprises nitrogen which would likewise build up on recirculation into the process and thus lead to considerable reduction of the space-time yield. The exhaust gas is therefore customarily burnt, wherein the energy liberated in the course of this process can be utilized for steam generation.

However, it would be economically more favorable to isolate the valuable materials present in the exhaust gas and recirculate them to the process for producing hydroxylamine or hydroxylammonium salts.

When valuable materials are recirculated to the process for producing hydroxylamine or hydroxylammonium salts, however, in particular dinitrogen monoxide, which is inert in the process for producing hydroxylamine or hydroxylammonium salts, must not be recycled in conjunction, in order to prevent it from building up, since otherwise it would lead to ignitable mixtures, as described above.

Therefore, in the prior art, processes have been proposed in which the dinitrogen monoxide is separated off from the exhaust gas of the hydroxylamine synthesis that comprises hydrogen, dinitrogen monoxide, nitrogen monoxide and inert substances.

For example, in DE-A 032 44 370, a pressure-swing adsorption on molecular sieves is proposed therefor. A disadvantage of this process is that the gas mixture comprises the aggressive component nitrogen monoxide which is a free radical and rapidly attacks the adsorption material, and so frequent exchange of same is required.

WO-A 02/30549 describes a process for separating off dinitrogen monoxide from the exhaust gas of the production of hydroxylamine, more precisely by using semi-permeable gas-permeable membranes. In this process, also, the aggressivity of the nitrogen monoxide causes a decreased membrane stability and therefore a limited economic efficiency of the process. Furthermore, only partial separation of dinitrogen monoxide is possible using this process.

Therefore, it is an object of the present invention to provide a process for working up the exhaust gas from a system for producing hydroxylamine or hydroxylammonium salts by catalytic reduction of nitrogen monoxide with hydrogen, in which one of the valuable materials present in the exhaust gas can be at least partially separated off economically from the exhaust gas.

The object is achieved by a process for working up an exhaust gas A from a system for producing hydroxylamine or hydroxylammonium salts by catalytic reduction of nitrogen monoxide with hydrogen, wherein the exhaust gas A comprises nitrogen monoxide, hydrogen, dinitrogen monoxide, nitrogen and ammonia, and at least some of the hydrogen present in the exhaust gas A is separated off from the exhaust gas A by means of a gas-tight membrane-electrode assembly which comprises at least one selectively proton-conducting membrane, a retentate side, a permeate side, and, on each side of the membrane, at least one electrode catalyst, wherein, on the retentate side of the membrane, at least some of the hydrogen is oxidized to protons at the anode catalyst and the protons, after crossing the membrane, are, on the permeate side, at the cathode catalyst according to I reduced to hydrogen and/or
II reacted with oxygen to form water, wherein the oxygen originates from an oxygen-comprising stream O which is contacted with the permeate side.

The purpose of the processes described in the prior art for separating off the valuable materials present in the exhaust gas A is separating off dinitrogen monoxide and recirculating the residual materials.

It has surprisingly been found that separating off the hydrogen present in the exhaust gas A by means of a gas-tight membrane-electrode assembly is effectively possible. The process according to the invention, compared with the processes described in the prior art, has the advantage that separating off the valuable material hydrogen is made possible. The driving force of the hydrogen separation is based either on a potential difference between the two sides of the membrane that is selectively permeable to protons (alternative I) or on the negative free enthalpy of reaction of hydrogen and oxygen to form water (alternative II). Costly processes such as, for example, pressure-swing adsorption, can thereby be dispensed with. The use of gas-tight selectively proton-conducting membranes in addition leads to the process being substantially independent of pressure differences which are necessary when gas-permeable semi-permeable membranes are used. As a result, the hydrogen separation can be carried out at relatively low pressures and pressure differences, wherein, optionally, an externally applied pressure difference can be dispensed with completely. The mechanical stress of the membrane is markedly decreased thereby, which leads to an increase in its long-term stability. Furthermore, the choice of materials coming into consideration for the membrane is increased.

The electrochemical separation of hydrogen by means of a selectively proton-conducting membrane is, in addition, very effective. Therefore, the membrane area required can be reduced or, for the same membrane area, markedly more hydrogen can be separated off from the exhaust gas. The amount of hydrogen remaining in the exhaust gas A after separation is markedly less in this case than in the separation by means of a gas-permeable semi-permeable membrane.

If the process according to the invention is operated according to alternative I, very pure hydrogen is obtained in the process. Very pure hydrogen can be used in many further reactions or processes which react sensitively to impurities and is therefore a valuable byproduct. In a preferred embodiment, the hydrogen separated off from the exhaust gas A is again used as starting material in the production of hydroxylamine or hydroxylammonium salts.

If the process according to the invention is operated according to alternative II, electrical energy and heat are liberated in the process. This energy can be utilized for operating the process for producing hydroxylamine or hydroxylammonium salts. The energy balance of the process according to the invention is further improved thereby.

Depending on the mode of operation, the user can control whether more, or exclusively, hydrogen, or more, or exclusively, electrical energy and heat are obtained in the process. It is also possible to use the electrical energy obtained according to alternative II for separating off the hydrogen according to alternative I. In this case a combined process is carried out, in which electrical energy is obtained according to alternative II, which electrical energy is used for separating off hydrogen according to alternative I. The process steps of hydrogen separation according to alternative I and obtaining electrical energy (alternative II) can be carried out in any sequence in this case. For this purpose, the exhaust gas stream A can be separated, for example, into two exhaust gas substreams A1 and A2, wherein from one exhaust gas substream hydrogen is separated off according to alternative I, and from the other exhaust gas substream, hydrogen is separated off according to alternative II, producing electrical energy.

The invention will be described in detail hereinafter.

Hydroxylamine Synthesis

The industrial synthesis of hydroxylamine or hydroxylammonium salts proceeds via reduction of nitrogen monoxide with hydrogen in acidic, aqueous solution. In the context of the present invention, "production of hydroxylamine", "production of hydroxylammonium salts" and "production of hydroxylamine or hydroxylammonium salts" are used synonymously.

For production of 1 mol of hydroxylammonium sulfate $(NH_3OH)_2SO_4$, 2 mol of nitrogen monoxide (NO), 3 mol of hydrogen ($H_2$) and 1 mol of sulfuric acid ($H_2SO_4$) are reacted in aqueous solution in the presence of a catalyst.

The catalyst used is customarily a catalyst comprising platinum and graphite which is suspended in an aqueous solution comprising sulfuric acid. Optionally, additives such as, for example, promoters, can be added to the catalyst.

The aqueous solution in which the catalyst is suspended generally comprises sulfuric acid at concentrations in the range from 5 to 50% by volume, preferably 10 to 30% by volume, more preferably 15-25% by volume, in each case based on the total volume of the aqueous solution.

The reaction of hydrogen and nitrogen monoxide is generally carried out at temperatures in the range from 0 to 100° C., preferably in the range from 10 to 70° C., more preferably in the range from 30 to 60° C., and particularly preferably in the range from 40 to 50° C.

For this purpose, a starting material stream E comprising nitrogen monoxide and hydrogen is introduced into a stirred tank which comprises the aqueous solution and the catalyst suspended therein. The reaction of hydrogen and nitrogen monoxide proceeds in the presence of the suspended catalyst in the aqueous solution, wherein hydroxylammonium sulfate is formed immediately. The resultant hydroxylammonium sulfate is dissolved in the aqueous solution. It is also possible to arrange a plurality of stirred tanks in series to form a stirred-tank cascade. Generally, 2 to 20, preferably 4 to 15, more preferably 4 to 10, and particularly preferably 5 to 8 stirred tanks are arranged to form a stirred-tank cascade. In the event that the reaction is carried out in a stirred-tank cascade, the hydroxylammonium sulfate is concentrated by the advancing conversion in the stirred-tank cascade. The aqueous solution which leaves the last stirred tank of the stirred-tank cascade generally has hydroxylammonium sulfate concentrations in the range from 5 to 50% by weight, preferably 10 to 40% by weight, more preferably 15 to 35% by weight, particularly preferably 20 to 30% by weight, in each case based on the total weight of the aqueous solution.

The hydroxylammonium sulfate can be cleaved in a downstream step to hydroxylamine and sulfuric acid by processes known to those skilled in the art.

The exhaust gas stream A which leaves the stirred tank, or the stirred-tank cascade, generally comprises 60 to 80% by volume hydrogen, 5 to 10% by volume nitrogen monoxide, 5 to 10% by volume dinitrogen monoxide and 0 to 40% by volume further components such as, for example, nitrogen and ammonia.

Hydrogen Separation

According to the invention at least some of the hydrogen present in the exhaust gas A is separated off electrochemically by means of a gas-tight membrane-electrode assembly, wherein the hydrogen that is to be separated off is transported in the form of protons through the membrane. For this purpose, the exhaust gas A which leaves the stirred tank or the stirred-tank cascade is passed through a device which comprises at least one MEA. The electrodes having the membrane arranged therebetween are termed a membrane-electrode assembly (MEA). According to the invention, the gas-tight MEA comprises at least one selectively proton-conducting membrane.

From the exhaust gas A which leaves the stirred tank or the stirred-tank cascade, optionally, one or more further valuable materials can be separated off. The separation of one or more further valuable materials can proceed before and/or after the separation of the valuable material hydrogen. It is also possible that one or more further materials are separated off at the same time as the hydrogen is separated off.

The separation of one or more further materials from the exhaust gas A can proceed by generally known methods that are familiar to those skilled in the art, for example by condensation, distillation or extraction. The choice of the pressure and temperature range depends on the physical properties of the compounds that are to be separated and is known to those skilled in the art.

The MEA is preferably formed as a slab or as a tube, wherein the customary membrane arrangements that are known from the prior art for separating gas mixtures can be used.

The exhaust gas A is conducted along one side of the membrane. This side is called the retentate side hereinafter. The other side of the membrane is termed the permeate side hereinafter. On the permeate side, the hydrogen which is formed according to alternative I and/or the water that is formed according to alternative II is removed. The membrane, on each side, comprises at least one electrode catalyst, wherein, in the context of this description, the electrode catalyst situated on the retentate side is termed anode catalyst and the electrode catalyst situated on the permeate side is termed cathode catalyst. On the retentate side, the hydrogen is oxidized at the anode catalyst to form protons, these cross the membrane and are reduced, to hydrogen (alternative I) on the permeate side at the cathode catalyst, or are reacted with oxygen to form water (alternative II). According to alternative II, for this purpose, an oxygen-comprising stream O is conducted along on the permeate side and brought into contact with the permeate side.

The oxygen-comprising stream O comprises at least 15% by volume of oxygen. Particularly preferably, air is used as oxygen-comprising stream O.

In the case of alternative I, for the transport of the protons through the membrane, electrical energy must be employed, which electrical energy is supplied by applying a DC voltage to the two sides of the membrane by means of electrodes. In the case of alternative II, electrical energy is formed.

In a preferred embodiment, the exhaust gas A is used directly. Directly in this context means that the exhaust gas A is used immediately without previous purification or workup in the process according to the invention.

The hydrogen obtained according to alternative I has a high purity. It can be collected and sold or used for energy generation. Owing to the high purity, the hydrogen can also be used in further chemical reactions or processes which react sensitively to impurities. In the process according to alternative II, heat and electrical energy are liberated. The heat can be used, for example, for heating the reaction in which the exhaust gas A is formed. In a preferred embodiment, the hydrogen is used again in the catalytic reduction of nitrogen monoxide with hydrogen for producing hydroxylammonium sulfate. The hydrogen that is separated off can be recirculated directly into the stirred tank, or the stirred-tank cascade, i.e. without further workup. It is also possible to subject the hydrogen to further workup steps. The hydrogen can be recirculated in this case by a separate feed line to the stirred tank or the stirred-tank cascade. It is also possible to add the hydrogen to the starting material stream E. In a preferred embodiment, the hydrogen that is separated off is added to the starting material stream E.

In order to ensure a good contact of the membrane with the hydrogen situated on the retentate side and good removal of the hydrogen or the water that is separated off on the permeate side, the electrode layers are customarily contacted with electrically conducting gas distribution layers. These are, for example, plates having a grid-like surface structure of a system of fine channels, or layers of porous electrically conducting material such as nonwoven, woven fabric or carbon paper. The totality of gas distribution layer and electrode layer is generally termed a gas diffusion electrode (GDE). By means of the gas distribution layer, the hydrogen that is to be separated off, on the retentate side, is conducted close to the membrane and the anode catalyst, and, on the permeate side, the removal of the hydrogen or water that is formed is facilitated.

The MEA used according to the invention is gas-tight, that is to say it has virtually no porosity through which gases can pass in atomic or molecular form from one side to the other side of the MEA, nor does it have mechanisms by which gases can be unselectively transported through the MEA, for example, by adsorption, dissolution in the membrane, diffusion and desorption. Gas-tight in the context of the present invention means that, of the total amount of the hydrogen that is separated off in the form of hydrogen according to alternative I or in the form of water according to alternative II, at least 95%, preferably at least 97%, more preferably at least 98%, and particularly preferably at least 99.5%, crosses the membrane in the form of protons.

The membrane used according to the invention selectively conducts protons, that is to say, in particular, that it is not electron-conducting. In the process according to the invention, as proton-conducting membrane, in principle all materials can be used which are used in the prior art as membrane material for fuel cells.

For the transport of protons through the membrane, according to alternative I, electrical energy must be employed which is supplied by applying a DC voltage to both sides of the membrane by means of electrodes.

The hydrogen is separated off according to alternative I, accordingly, by developing a potential difference between the two sides of the membrane by applying a voltage. The separation is carried out at voltages from 0.05 to 2000 mV, preferably from 100 to 900 mV, particularly preferably from 100 to 800 mV, measured against a hydrogen reference electrode (RHE). Generally, the hydrogen is separated off at current densities in the range from 0.1 to 2.0 A/cm$^2$.

According to alternative II, an oxygen-comprising stream O is conducted along on the permeate side of the membrane. According to alternative II, on the permeate side the protons react at the cathode catalyst with the oxygen to form water. The driving force is the reduction of oxygen. In the overall reaction, energy is liberated in the form of heat and, by intermediate connection of a consumer, in the form of electrical current.

The hydrogen can be separated off by the process according to the invention not only according to variant I, but also according to variant II, at temperatures from 0 to 1000° C.

The choice of suitable temperature range depends in this case critically on the membrane material used. In the case of use of polymer membranes a), the hydrogen is generally separated off at temperatures in the range from 0 to 100° C., preferably in the range from 20 to 100° C., particularly preferably in the range from 60 to 100° C., and particularly preferably in the range from 70 to 90° C. In case of use of polymer membranes a) it is also possible to separate the hydrogen off at temperatures in the range of 20 to 120° C., preferably in the range of 20 to 110° C.

In the case of use of PAFC (Phosphoric Acid Fuel Cell) membranes b), the hydrogen is generally separated off at temperatures in the range from 100° C. to 200° C.

In the case of use of ceramic membranes c), the hydrogen is generally separated off at temperatures in the range from 200° C. to 1000° C.

The hydrogen is separated off by the process according to the invention preferably at pressures from 0.5 to 10 bar, preferably from 1 to 6 bar, particularly preferably from 1 to 3 bar, in particular at atmospheric pressure. According to a preferred embodiment of the invention, the pressure difference between the retentate side and the permeate side of the membrane is below 1 bar, preferably below 0.5 bar, particularly preferably there is no pressure difference.

In the case of hydrogen separation according to alternative I, it is, in addition, possible to compress the hydrogen on the permeate side. This is the case when the hydrogen is not removed on the permeate side. The compression takes place in that the hydrogen, owing to the formation of a potential difference, is transported from the exhaust gas A through the MEA to the permeate side. By means of the process according to the invention, on the permeate side, a pressure of up to 50 bar, preferably up to 15 bar, and particularly preferably up to 10 bar, can be built up.

According to the invention, at least some of the hydrogen present in the exhaust gas A is separated off. Generally, at least 10%, preferably at least 50%, particularly preferably at least 70%, very particularly preferably at least 95%, and particularly preferably, at least 98% is separated off.

The hydrogen obtained on the permeate side according to alternative I comprises a maximum of 5 mol %, preferably a maximum of 2 mol %, and particularly preferably a maximum of 1 mol %, of impurities, such as nitrogen monoxide, dinitrogen monoxide, nitrogen and ammonia.

The hydrogen obtained on the permeate side according to alternative I comprises a maximum of 5% by volume, preferably a maximum of 2% by volume, and particularly preferably a maximum of 1% by volume, of impurities, such as nitrogen monoxide, dinitrogen monoxide, nitrogen and ammonia.

The hydrogen, depending on the selectively proton-conducting membrane used, can comprise up to 60% by volume, preferably up to 10% by volume, particularly preferably up to 2% by volume, of water. The presence of water is required for moistening the polymer membrane in some membrane types, for example in certain polymer membranes.

The electrochemical separation of the hydrogen takes place according to the invention outside the stirred tank or the stirred-tank cascade in which the hydroxylamine production is carried out.

According to a preferred embodiment, the hydrogen is separated off from the exhaust gas A in a reactor which is equipped with at least one gas-tight MEA. The separation can be carried out, in one embodiment, for example in a reactor, the outer walls of which are formed at least in part of gas-tight MEAs.

The hydrogen can be separated off according to the invention by alternative I, by alternative II, or by both alternatives. The latter means that at least some of the hydrogen is obtained as hydrogen and at least some of the hydrogen is obtained as water with generation of electrical energy. How much of the hydrogen present in the exhaust gas A is separated off in each case according to alternatives I and II can be adapted by the user as required. According to a preferred embodiment of the invention, when the hydrogen is separated off by alternatives I and II, at least as much hydrogen is separated off according to alternative II that the current generated in this case is sufficient to cover the energy requirement for the hydrogen separation according to alternative I.

If the hydrogen is separated off from the exhaust gas A according to both alternatives I and II, this is always carried out spatially separated, since, in the presence of oxygen on the permeate side, customarily the protons react directly to form water. The exhaust gas A can, for example, be successively passed first along an MEA which is in contact on the permeate side with a stream O in such a manner that some of the hydrogen is separated off as water. Subsequently, the exhaust gas A is conducted along an MEA to which a voltage is applied in such a manner that the hydrogen is separated off as hydrogen. The spatial separation between the two alternatives I and II can also be such that the exhaust gas A is passed between two, for example opposite, membranes, of which one is in contact with a stream O on the permeate side and a voltage is applied to the other.

The hydrogen that is separated off can be further dried before further use, this is carried out, in particular, if the separation proceeds via a polymer membrane which must be moistened.

Electrode Catalysts

For separating off the hydrogen from the exhaust gas A, all electrode catalysts known to those skilled in the art can be used.

The function of electrode catalyst is described, e.g., in Journal of Power Sources 177 (2008), 478-484, K. A. Perry, G. A. Eisman, B. C. Benicewicz "Electrochemical hydrogen pumping using a high-temperature polybenzimidazole (PBI) membrane".

In order to ensure good contact of the membrane with the hydrogen situated on the retentate side and good removal of the hydrogen separated off on the permeate side, the electrode layers are customarily contacted with gas distribution layers. These are, for example, plates having a grid-like surface structure of a system of fine channels or layers of porous material such as nonwoven, woven fabric or paper. The totality of gas distribution layer and electrode layer is generally termed gas diffusion electrode (GDE). By means of the gas distribution layer, the hydrogen that is to be separated off, on the retentate side, is conducted close to the membrane and the anode catalyst, and, on the permeate side, the removal of the hydrogen formed is facilitated.

Depending on the embodiment of the invention, the anode can also serve simultaneously as anode catalyst and the cathode can also serve simultaneously as cathode catalyst. However, in each case different materials can be used for the anode and the anode catalyst, or for the cathode and the cathode catalyst.

As electrode catalyst material, the customary compounds and elements known to those skilled in the art can be used which can catalyze the dissociation of molecular hydrogen into atomic hydrogen, the oxidation of hydrogen to protons and also the reduction of protons to hydrogen. Suitable substances are, for example, Pd, Pt, Cu, Ni, Ru, Fe, Co, Cr, Mn, V, W, tungsten carbide, Mo, molybdenum carbide, Zr, Rh, Ag, Ir, Au, Re, Y, Nb and also alloys and mixtures thereof, preference according to the invention is given to Pd, Pt and Ni. The elements and compounds mentioned above as electrode catalyst material can also be present on supports, preference in this case is given to carbon as support.

According to a preferred embodiment of the present invention, electrodes preferably containing carbon as conducting material are used. In this case the carbon and an electrode catalyst are preferably applied to a porous support such as nonwoven, woven fabric or paper. The carbon in this case can be mixed with the catalyst, or the carbon is applied first and then the catalyst. Particular preference is given to the use of platinum on carbon for the anode and the cathode.

According to a further embodiment of the invention, the electrically conducting material used as electrode and the electrode catalyst are applied directly on the membrane.

Membranes

The membrane is preferably constructed as a plate or tube, wherein the customary membrane arrangements known from the prior art for the separation of gas mixtures can be used.

The MEA used according to the invention is gas-tight, that is to say it has virtually no porosity through which gases can pass from one side to the other side of the MEA in atomic or molecular form, nor does it have mechanisms by which gases can be transported unselectively through the MEA, for example by adsorption, dissolution in the membrane, diffusion and desorption. The tightness of the membrane-electrode assembly (MEA) can be ensured either by a gas-tight membrane, by a gas-tight electrode, or a gas-tight electrode catalyst and also by a combination thereof. Thus, as gas-tight electrode, for example a thin metal foil can be used, for example a Pd, Pd—Ag or Pd—Cu foil. The use of metal foils has, in addition, the advantage that the proton-conducting membrane is protected from aggressive components of the exhaust gas A, such as nitrogen monoxide and ammonia. In addition, the membrane used according to the invention selectively conducts protons, that is to say, in particular, it is not electron-conducting.

According to the invention, for the membranes, all materials known to those skilled in the art can be used from which selectively proton-conducting membranes may be formed. These include, for example, the materials listed by J. W. Phair and S. P. S. Badwal in Ionics (2006) 12, pages 103-115. Selectively proton-conducting membranes as are known from fuel cell technology can also be used according to the invention.

The membrane materials can be distinguished here according to three conduction mechanisms:

a) Polymer Membranes. If the membrane used is a polymer membrane, it is assumed that the proton transport proceeds by the Grotthuss mechanism and/or the transport proceeds via hydroxonium ions. That is to say the polymer membrane in this case comprises functional groups which can reversibly bind hydroxonium ions ($H_3O^+$ ions). Particular preference in this case is given to the use of water-swollen polymer membranes. It is assumed that the transport of the protons through the membrane in this case proceeds by the flipping of hydrogen bonds between the water present in the polymer membrane and the reversibly bound hydroxonium ions present in the polymer membrane. Moreover, it is assumed that the proton transport proceeds in form of hydroxonium ions, which move through the polymer membrane.

b) Phosphoric Acid Fuel Cell (PAFC) Membranes. If the membrane used is a PAFC membrane, the membrane comprises a support substance and phosphoric acid ($H_3PO_4$). Phosphoric acid serves as an electrolyte in this membrane type.

c) Ceramic Membranes. If the membrane used is a ceramic membrane, this comprises inorganic materials which, at the temperatures of hydrogen separation, comprise defects. The transport of the protons through the membrane in this case proceeds via the defects in the ceramic membrane.

For example, the ceramic membranes c) hereinafter such as certain heteropolyacids such as $H_3Sb_3B_2O_{14}.10H_2O$, $H_2Ti_4O_9.12H_2O$ and $HSbP_2O_8.10H_2O$; acidic zirconium silicates, -phosphates and -phosphonates in a layered structure such as $K_2ZrSi_3O_9$, $K_2ZrSi_3O_9$, alpha-$Zr(HPO_4)_2.nH_2O$, gamma-$Zr(PO_4)$—$(H_2PO_4).2H_2O$, alpha- and gamma-Zr-sulfophenyl phosphonate or sulfoaryl phosphonate; non-layered oxyhydrates such as antimonic acid ($Sb_2O_5.2H_2O$), $V_2O_5.nH_2O$, $ZrO_2.nH_2O$, $SnO_2.nH_2O$ and $Ce(HPO_4)_2.nH_2O$ can be used. In addition, oxo acids and salts which comprise, for example, sulfate, selenate, phosphate, arsenate, nitrate groups, etc., can be used. Those which are particularly suitable are oxoanion systems based on phosphates or complex heteropolyacids such as polyphosphate glasses, aluminum polyphosphate, ammonium polyphosphate and polyphosphate compositions such as $NH_4PO_3/(NH_4)_2SiP_4O_{13}$ and $NH_4PO_3/TiP_2O_7$. In addition, oxidic materials can be used, such as brownmillerite, fluorites and phosphates having an apatite structure, pyrochlore minerals and perovskites. In general, all proton-conducting materials such as, for example, including zeolites, aluminosilicates, $xAl_2O_3(1-x)SiO_2$, $SnP_2O_7$, $Sn_{1-x}In_xP_2O_7$ (X=0.0-0.2), can be used.

Perovskites have the basic formula $AB_{1-x}M_xO_{3-y}$, wherein M is a trivalent rare earth element which serves for doping, and y designates the oxygen deficiency in the perovskite oxide lattice. It is possible to select A, for example, from Mg, Ca, Sr and Ba. B can, inter alia, be selected from Ce, Zr and Ti. For A, B and M, also, independently of one another, various elements can be chosen from the respective groups.

In addition, structurally modified glasses can be used as ceramic membranes c), such as chalcogenide glasses, PbO—$SiO_2$, BaO—$SiO_2$ and CaO—$SiO_2$. Furthermore, suitable proton-conducting ceramics and oxides are described, for example, in Solid State Ionics 125, (1999), 271-278; Journal of Power Sources 180, (2008), 15-22; Ionics 12, (2006), 103-115; Journal of Power Sources 179 (2008) 92-95; Journal of Power Sources 176 (2008) 122-127 and Electrochemistry Communications 10 (2008) 1005-1007.

Further examples of proton-conducting ceramics c) and oxides are $SrCeO_3$, $BaCeO_3$, $Yb:SrCeO_3$, $Nd:BaCeO_3$, $Gd:BaCeO_3$, $Sm:BaCeO_3$, $BaCaNdO_5$, $Y:BaCeO_3$, $Y:BaZrCeO_3$, Pr-doped $Y:BaCeO_3$, $Gd:BaCeO_3$, $BaCe_{0.9}Y_{0.1}O_{2.95}$ (BYC), $SrCe_{0.95}Yb_{0.05}O_{3-\alpha}$, $BaCe_{0.9}Nd_{0.10}O_{3-\alpha}$, $CaZr_{0.96}In_{0.04}O_{3-\alpha}$, ($\alpha$ denotes the number of oxygen vacancies per unit formula of the oxide of the perovskite type); Sr-doped $La_3P_3O_9$, Sr-doped $LaPO_4$, $BaCe_{0.9}Y_{0.1}O_{3-\alpha}$ (BCY), $BaZr_{0.9}Y_{0.1}O_{3-\alpha}$ (BZY), $Ba_3Ca_{1.18}Nb_{1.82}O_{8.73}$ (BCN18), $(La_{1.95}Ca_{0.05})Zr_2O_{7-\alpha}$, $_{La2}Ce_2O_7$, $Eu_2Zr_2O_7$, $H_2S/(B_2S_3$ or $Ga_2S_3)/GeS_2$, $SiS_2$, $As_2S_3$ or CsI; $BaCe_{0.8}Gd_{0.2}O_{3-\alpha}$ (BCGO); Gd-doped $BaCeO_3$ such as $BaCe_{0.85}Y_{0.15}O_{3-\alpha}$ (BCY15) and $BaCe_{0.8}Sm_{0.2}O_{3-\alpha}$, $xAl_2O_3(1-x)SiO_2$, $SnP_2O_7$, $Sn_{1-x}In_xP_2O_7$ (x=0.0-0.2).

A further class of materials which are suitable for producing gas-tight and selectively proton-conducting membranes are polymer membranes a). Suitable polymers for producing polymer membranes a) are, for example, sulfonated polyether ether ketones (S-PEEK) sulfonated polyethersulfones, sulfonated polybenzoimidazoles (S-PBI) and sulfonated partially fluorinated or perfluorinated hydrocarbon polymers such as, for example, NAFION® (Fa. DuPont). In addition, partially fluorinated or perfluorinated polysulfonic acids, polymers based on styrene, poly(arylene ethers), polyimides and polyphosphazenes can be used.

As PAFC membranes b), all support materials known to those skilled in the art can be used that are selectively proton-conducting in combination with phosphoric acid as electrolyte. For example, polybenzamidazole membranes can be used that are based on polybenzimidazole and phosphoric acid as are marketed, for example, under the names Celtec-P® from BASF SE. Furthermore, for example, PAFC membranes based on Teflon or silicon carbide (SiC) can be used. Suitable support materials are selected from the group consisting of polybenzimidazole, Teflon ans siliconcarbide (SiC).

In a preferred embodiment, polymer membranes a) can be used.

When polymer membranes are used, these are customarily moistened by the presence of water on at least one side of the membrane. For this purpose, on at least one side of the membrane, a gas stream is provided which comprises 0.5 to 60% by volume of water. On the anode side (retentate side), water can be added to the exhaust gas A. It is also possible to set the reaction conditions in the production of hydroxylamine or hydroxylammonium salts in such a manner that the exhaust gas A comprises sufficient water due to the mode of production.

The invention will be illustrated by the examples hereinafter, without being restricted thereto.

EXAMPLES a) Hydrogen Separation in a 50 $cm^2$ Fuel Cell (Celtec-P 1000 Membrane)

In a 50 $cm^2$ fuel cell, an MEA comprising gas-diffusion electrodes (anode and cathode) and a Celtec-P 1000 Standard Membrane are used. The structure of the fuel cell is known to those skilled in the art. The MEA is positioned in this case between what are termed flow fields which act as current collectors (or as contacts) and also serve for the gas feed. At the same time, pressing via end plates is performed, by means of which a defined pressure on the flow fields can be set. The pressing is necessary, principally, for good contacting within the electrochemical cell. The gas-diffusion electrodes have a catalyst loading of 1 mg of Pt per $cm^2$ and have a catalyst layer thickness of 30 to 150 μm. As membrane, a Celtec-P Standard Membrane is used. For the hydrogen separation process, a mixture (composition based on dry gas) of hydrogen (70%), nitrogen monoxide (8%), dinitrogen monoxide (8%) and nitrogen (14%) is passed into the gas feed of the anode flow field. The gas stream is 500 ml/min and is saturated with water or water vapor before entry into the anode flow field. The hydrogen reacts at the anode according to the following equation $H_2 \rightarrow 2H^+ + 2e^-$. The protons formed arrive via the proton-conducting membrane at the cathode, at which the back reaction $2H^+ + 2e^- \rightarrow H_2$ proceeds by reduction of the protons. The cathode gas stream is likewise saturated with water or water vapor in order to prevent the polymer membrane from drying out. The reaction takes place at a cell temperature of 160° C. The maximum current density is 1.5 $A/cm^2$. The use of this electrochemical cell makes possible the compression of the hydrogen that is separated off.

b) Hydrogen Separation in a 50 $cm^2$ Fuel Cell (Nafion 112 Membrane)

In a 50 $cm^2$ fuel cell, an MEA comprising gas-diffusion electrodes (anode and cathode) and Nafion 112 membrane are used. In this case the membrane electrode structure is positioned between what are termed flow fields which act as current collectors (or as contacts) and also serve for the gas feed. At the same time, pressing is performed via end plates by means of which a defined pressure can be set on the flow fields. The pressing is necessary, primarily, for good contacting within the electrochemical cell.

The gas-diffusion electrodes have a catalyst loading of 1 mg of Pt per $cm^2$ and have a catalyst layer thickness of 80 to 120 μm. As membrane, a Nafion 112 Membrane is used. For the hydrogen separation process, a mixture (composition based on dry gas) of hydrogen (70%), nitrogen monoxide (8%), dinitrogen monoxide (8%) and nitrogen (14%) is passed into the gas feed of the anode flow field. The gas stream is 500 ml/min and is saturated with water or water vapor prior to entry into the anode flow field. The hydrogen reacts at the anode according to the following equation $H_2 \rightarrow 2H^+ + 2e^-$. The protons formed arrive via the proton-conducting membrane at the cathode, at which the back reaktion $2H^+ + 2e^- \rightarrow H_2$ proceeds by reduction of the protons. The cathode gas stream is likewise saturated with water or water vapor in order to prevent the polymer membrane from drying out. The reaction takes place at a cell temperature of 70° C. The maximum current density is 2 $A/cm^2$. The use of this electrochemical cell makes possible the compression of the hydrogen that is separated off.

The invention claimed is:

1. A process for working up an exhaust gas A from a system for producing hydroxylamine or hydroxylammonium salts by catalytic reduction of nitrogen monoxide with hydrogen, wherein the exhaust gas A comprises nitrogen monoxide, hydrogen, dinitrogen monoxide, nitrogen and ammonia, and at least some of the hydrogen present in the exhaust gas A is separated off from the exhaust gas A by means of a gas-tight membrane-electrode assembly which comprises at least one selectively proton-conducting membrane, a retentate side, a permeate side, and, on each side of the membrane, at least one electrode catalyst, wherein, on the retentate side of the membrane, at least some of the hydrogen is oxidized to protons at the anode catalyst and the protons, after crossing the membrane, are, on the permeate side, at the cathode catalyst according to I reduced to hydrogen and/or II reacted with oxygen to form water, wherein the oxygen originates from an oxygen-comprising stream O which is contacted with the permeate side.

2. The process according to claim 1, wherein, in the case of simultaneous separation of the hydrogen according to I and II, at least some of the stream generated in II is used in I.

3. The process according to claim 1, wherein, in the case of separation of the hydrogen according to II, at least some of the heat formed in II is fed to the system for producing hydroxylamine or hydroxylammonium salts.

4. The process according to claim 1, wherein, according to I, the hydrogen is separated by applying a voltage of from 0.05 to 2000 mV over a hydrogen reference electrode.

5. The process according to claim 1, wherein the oxygen-comprising stream O comprises at least 15% by volume of oxygen.

6. The process according to claim 1, wherein air is used as oxygen-comprising stream O.

7. The process according to claim 1, wherein the electrodes of the membrane-electrode assembly are designed as gas-diffusion electrodes.

8. The process according to claim 1, wherein a polymer membrane a) is used as selectively proton-conducting membrane.

9. The process according to claim 1, wherein a membrane that contains a support material and phosphoric acid is used as selectively proton-conducting membrane.

10. The process according to claim 9, wherein the membrane contains a support material selected from the group consisting of polybenzimidazole, Teflon® and silicon carbide.

11. The process according to claim 1, wherein a ceramic membrane c) is used as selectively proton-conducting membrane.

12. The process according to claim 1, wherein partially fluorinated or perfluorinated hydrocarbon polymers are used as selectively proton-conducting membrane.

13. The process according to claim 1, wherein sulfonated polyether ether ketones (S-PEEK) are used as selectively proton-conducting polymer membrane.

14. The process according to claim 1, wherein the hydrogen is separated off at temperatures in the range from 0 to 200° C.

15. The process according to claim 1, wherein the hydrogen is separated off at temperatures in the range from 70 to 90° C.

* * * * *